INVENTORS: M. A. DUGUAY
J. A. GIORDMAINE
P. M. RENTZEPIS

BY:
ATTORNEY

3,541,542
DISPLAY SYSTEM USING TWO-PHOTON FLUORESCENT MATERIALS

Michel A. Duguay, Berkeley Heights, Joseph A. Giordmaine, Summit, and Peter M. Rentzepis, Millington, N.J., assignors to Bell Telephone Laboratories, Incorporated, Murray Hill and Berkeley Heights, N.J., a corporation of New York
Filed Sept. 15, 1967, Ser. No. 668,052
Int. Cl. G01j 1/34
U.S. Cl. 340—324   12 Claims

ABSTRACT OF THE DISCLOSURE

A display system includes a medium which fluoresces only upon the absorption of two photons, one from each of two coincident signals having different frequencies and different intensities. One of the signals is an amplitude modulated train of picosecond image information pulses and the other is a train of picosecond interrogate pulses. Beam deflectors cause the two signals to overlap in appropriate regions of the medium to produce a sequence of fluorescent spots which constitute an optical representation of the image information. The display system operates as a detector of picosecond pulses by causing such a pulse to overlap within the medium a second pulse of a different frequency.

BACKGROUND OF THE INVENTION

This invention relates to display systems and more particularly to such systems utilizing two-photon fluorescent materials capable of displaying picosecond pulses.

Recent developments in the laser art have made it possible to phase-lock the oscillating modes of a laser by any of several well-known techniques including synchronous modulation and Q-switching. The output of a phase-locked laser is an optical pulse train having a pulse repetition rate give by $c/2L$, where $c$ is the velocity of light and $L$ is length of the active medium. More importantly, however, the pulse width of the pulses generated is typically in the picosecond range (i.e., $10^{-12}$ seconds). Such pulses, which are also produced by stimulated Raman emission, are ideally suited to serve as the carrier for an optical pulse code modulation system. To utilize such narrow pulses in an optical communication system it is necessary to be able to detect the pulses at a receiver. The enormous bandwith required to detect and display such narrow pulses, however, is not available in prior art receivers.

Characteristic of the prior art is the luminous spot display device which utilizes a gaseous medium such as mercury isotope 198. Two D.C. light beams generated by separate mercury arc lamps are made to overlap within the medium and to cause the medium in the region of overlap to emit green light. The disadvantages of such a system, however, are numerous. The most fundamental objection is that such mediums are characterized by atomic state lifetimes in the order of $10^{-8}$ seconds, much too long to detect picosecond pulses. Furthermore, the display device produces a luminous spot only if the two light beams are non-colinear. If the beams were colinear, the long lifetimes of mediums such as mercury vapor would produce a trace or spot several meters in length which is, of course, undesirable in any practical display device. Lastly, the light beams employed are noncoherent D.C. beams which are not readily modulated to carry optical information and are therefore unsuitable to serve as carriers in a practical display system.

SUMMARY OF THE INVENTION

The present invention employs materials which fluoresce when a sufficient number of electrons are excited from a lower to a higher energy state by an excitation signal or combination of signals. The electrons subsequently undergo a radiative transition from the higher to the lower energy state known as fluorescence. In accordance with an illustrative embodiment of the invention a display system utilizes a medium, typically diphenylcyclopentadiene dissolved in tetrahydrofuran, which fluoresces only upon the absorption of two photons per quantum of fluorescent radiation. To produce detectable fluorescence, however, the excitation signal must have a frequency such that twice its energy is greater than the energy separation between the lower and higher states. In the case where the excitation signal is a combination of two or more signals at different frequencies, the condition to be satisfied is that the sum of the frequencies be such that the excitation signal energy is greater than said energy separation. In addition, for the fluorescence to be visible or, in general, detectable the medium must absorb a certain minimum number of photons which means that the signal must have a certain minimum intensity.

In accordance with the present invention, one photon per quantum of fluorescent radiation is supplied from each of two coincident signals having different frequencies and different intensities. The signals themselves are typically picosecond pulses generated by a phase-locked laser, and the frequency referred to is the optical frequency of each pulse. Each signal alone does not produce fluorescence because one signal is of insufficient frequency to excite electrons across the energy gap of the medium, whereas the other signal, although of sufficient frequency, is of insufficient intensity to produce detectable flourescence. Where, however, the two signals overlap within the medium, both the frequency and intensity conditions are satisfied and fluorescence occurs in the region of overlap. The medium is particularly suitable for a two or three dimensional display device because no background trace is produced (i.e., a single signal produces no detectable fluorescence).

The use of a two-photon fluorescent medium, typically a liquid, distinguishes further the present invention from the prior art typified by luminous spot display devices utilizing mercury vapor. The atomic transitions which take place in the murcury isotope 198, for example, include a radiative transition from the $7^3S_1$ level to the $6^3P_2$ level. In the liquids of the present invention, however, that same transition would be radiationless. In contrast two-photon fluorescence involves the excitation of electrons from a ground level singlet state to a higher energy level singlet state by the absorption of two photons per quantum of fluorescent radiation, fluorescence occurring when the excited electrons fall back to the vibrational levels of the ground state A complete display system in accordance with the invention employs a source of picosecond pulses and appropriate modulators to impress image information onto one pulse train and logical or interrogate information onto another. Beam deflectors cause the two pulse trains to overlap at appropriate positions in the medium to produce a sequence of fluorescent spots which constitute an optical representation of the image information. A unique feature of the invention is that the two pulse trains (which may be optical picosecond pulses generated by a phase-locked laser) may be directed into the medium along colinear paths and still produce fluorescent paths and still produce fluorescent spots only in the regions of medium where an image pulse and an interrogate pulse overlap.

In addition, in many cases it is desirable to measure the pulse width and pulse repetition rate of a picosecond pulse train. The prior art has resorted to certain indirect methods of measurement including coincidence techniques which utilize nonlinear (e.g., electrooptic) crystals that generate as an output the sum and difference frequencies of two coincident signal inputs. To detect a pulse from a phase-locked laser, for example, the pulse is split into two signals and passed simultaneously through the crystal. The output of the crystal is detected. By inserting a variable time-delay into the path of one of the signals, the output can be reduced to zero. The amount of delay inserted is then an indirect measure of the pulse width. However, the measurements cannot be accurately made from a single pulse, rather many pulses are required to properly adjust the delay and reduce the output to zero.

A picosecond pulse detector in accordance with the present invention utilizes two-photon fluorescent materials of the type previously described. To detect a picosecond pulse of frequency $\omega_1$, for example, the pulse is passed through a polarizer and a second harmonic generator to produce a pulse at frequency $2\omega_1$. Both pulses are then passed through a dispersive medium, the result being that the pulse at $2\omega_1$ is delayed. Finally, both pulses are directed colinearly into a two-photon fluorescent medium. A mirror disposed at one end of the medium and normal to the pulse path transmits the pulse at $2\omega_1$, but reflects the pulse at $\omega_1$. Consequently, the pulse at $\omega_1$, after having been reflected, overlaps the delayed pulse at $2\omega_1$. The intensity $I_1$ of the pulse at $\omega_1$ is typically one hundred times greater than the intensity $I_2$ of the pulse at $2\omega_1$, and consequently fluorescence is produced only in the region of overlap within the medium. The fluorescent spot produced is a convolution of the overlapping pulses, the intensity of the spot being about $\alpha I_1 I_2 \Delta t$, where $\alpha$ is a constant and $\Delta t$ is the pulse width, and the length of the spot in the medium being proportional to the pulse width.

BRIEF DESCRIPTION OF THE DRAWINGS

The invention, together with its various features and advantages, can be easily understood from the following more detailed description taken in conjunction with the accompanying drawings, in which.

DETAILED DESCRIPTION

In general, detectable fluorescence involves two parameters, frequency and intensity. Frequency is related (by Planck's constant) to the signal energy required to excite electrons across the energy gap of the medium employed. Intensity, on the other hand, is related to the total numbers of photons supplied by an incident signal. Signal intensity is therefore related to the total number of photons absorbed by the medium which is in turn a measure of the fluorescent intensity produced. Thus, a signal may fail to produce detectable fluoresence either because its frequency is too low to excite electrons across the gap, or, although it may have the proper frequency, because its intensity is too low to cause the medium to absorb a sufficient number of photons. The latter properties are exploited in the display system of the present invention to eliminate background trace and to produce a fluorescent spot only in the region of the medium where two coincident signals overlap, as will be more fully described below.

Figure 1:
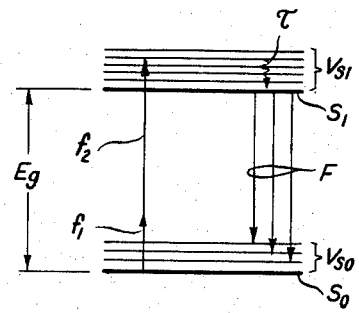
FIG. 1 shows schematically the energy level diagram of a two-photon fluorescent material utilized in the present invention.

The present invention employs a medium which requires the absorption of two photons to produce each quantum of fluorescent radiation. Furthermore, by appropriate choice of the frequencies and intensities of a pair of optical signals, detectable fluorescent radiation is produced only in the region of the medium where the signals are made to overlap, one photon being absorbed from each of the two signals per quantum of fluorescent radiation. Turning now to FIG. 1 there is shown schematically an energy level diagram for a two-photon fluorescent medium characterized by a pair of singlet states $S_0$ and $S_1$ separated by an energy gap $E_g$. Associated with each singlet state are a plurality of vibrational levels $V_{S0}$ and $V_{S1}$, respectively. Generally, fluorescence takes place upon the absorption of two photons per quantum of fluorescent radiation which causes electrons to be excited from $S_0$ to $S_1$ or to $V_{S1}$. In the latter case, the electrons subsequently undergo a nonradiative transition from $V_{S1}$ to $S_1$ from which state electrons fall to $V_{S0}$ accompanied by fluorescence F. Two signals are employed to produce two-photon fluorescence, one of frequency $f_1$ and intensity $I_1$, and the other of frequency $f_2$ and intensity $I_2$. The signal at $f_1$ is made to be such that the absorption of two photons from it alone does not excite electrons across the energy gap; that is, $2hf_1 < E_g$. On the other hand, the signal at $f_2$ is made to be such that the absorption of two photons from it alone produces fluorescence (i.e., $2hf_2 > E_g$), but not detectable fluorescence. This is accomplished by maintaining its intensity low, typically $I_2 \approx I_1/100$, which means that the total number of quanta of fluorescent radiation produced by the signal at $f_2$ is not high enough to be detected by the human eye (in the case of a visual display). Thus, neither signal alone produces detectable fluorescence and consequently neither produces a background trace. Where, however, the signals overlap within the medium both the conditions of frequency and intensity for detectable fluorescence are met. That is, the energy of the combined signals is sufficient to excite electrons across the gap since $h(f_1+f_2) > E_g$; and, the intensity of the combined signals produces a total number of quanta which is detectable. In summary, then, where the two signals are coincident and overlap, a fluorescent spot is produced in the region of overlap. But where the signals do not overlap, or are not coincident, no fluorescence and therefore no background trace is produced.

Figure 2:
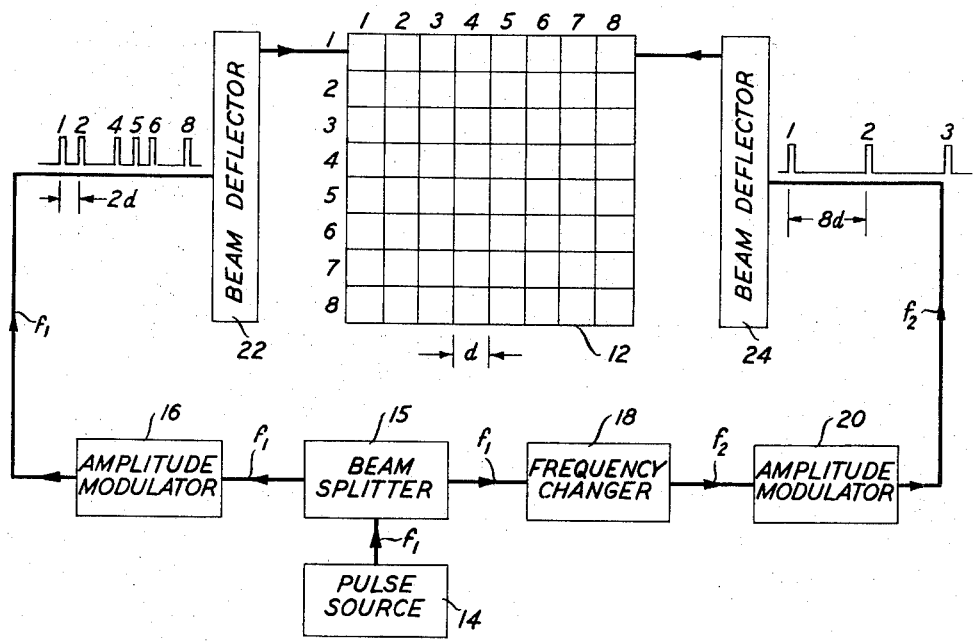
FIG. 2 shows schematically a display system in accordance with one embodiment of the invention.

These principles of two-photon fluorescence are embodied in a display system depicted schematically in FIG. 2. A cell 12 contains a two-photon fluorescent medium, typically pyrene, diphenylcyclopentadiene or tetraphenylcyclopentadiene dissolved in a solvent such as tetrahydrofuran. For the purposes of discussion the cell 12 has been divided into sixty-four imaginary subcells, eight on a side. The subcells represent regions of the medium in which two signals will be made to overlap and produce a fluorescent spot in accordance with image information to be displayed. A pulse source 14, typically a phase-locked laser, generates a train of picosecond pulses at an optical frequency $f_1$ such that $2hf_1 < E_g$. The optical frequency is to be distinguished from the pulse repetition rate which is $c/2L$, where $c$ is the speed of light and $L$ the effective length of the laser cavity. The pulse train is then divided into two separate signals or pulse trains at the same frequency $f_1$ by the beam splitter 15. One of the pulse trains is passed through amplitude modulator 16 where it is encoded with image information to be displayed. In the example of the 8 x 8 subcell system, this pulse train contains originally eight pulses each separated by a length in space of $2d$, where $d$ is the width of each subcell. The third and seventh pulses are deleted by the modulator 16 for the purposes of illustration. The other pulse train is passed through a frequency changer 18 (e.g., a KDP crystal) which produces at its output a pulse train at an optical frequency $f_2$ which is typically the second harmonic of $f_1$ (i.e., $f_2 = 2f_1$). The intensity of these pulses is however typically about one hundred times less than the intensity of the information pulses. The pulse train at $2f_1$ is then encoded by amplitude modulator 20 to produce a train of interrogate pulses separated in space by a distance $8d$. Beam deflector 22 positions the information pulse train along a path corresponding to row 1 of cell 12. Beam deflector 24 similarly positions the interrogate pulse train along a path colinear with the path of the information pulse train. The pulse spacing of the respective trains is such that the first interrogate pulse overlaps each information pulse in the appropriate subcell to produce a fluorescent spot in accordance with the image information. (In general, if each row of cell 12 is divided into $n$ imaginary subcells of width $d$, then information pulse train and the interrogate pulse train have respective pulse spacings of $2d$ and $nd$.) The intensity of the spot can be controlled of course by varying the amplitude of the optical pulses. More specifically, interrogate pulse 1 overlaps information pulse 8 in subcell 8. As the pulses propagate colinearly along row 1, the interrogate pulse 1 overlaps in turn information pulse 7 in subcell 7, and so forth. After the first eight information pulses (i.e., the first frame) are interrogated, a second frame of information pulses is positioned along row 2 by beam deflector 22, and interrogate pulse 2 is similarly positioned along row 2 by beam deflector 24. The process of overlapping pulses and producing fluorescent spots repeats as before. In this manner, a pattern of fluorescent spots is produced in the cell 12, the spots producing an optical representation of the image information.

Optical modulators and beam deflectors are both well known in the art and include, for example, those of the electrooptic type.

Although the cell 12 is depicted as being two dimensional, it is of course readily possible to devise a three dimensional display by merely placing the fluorescent medium in cubic-like volume and causing the information and interrogate pulses to overlap within appropriate regions of the three dimensional space. Similarly, a three dimensional color display can be constructed, for example, by positioning a plurality of cells on top of one another, each of the cells containing a different two-photon fluorescent medium each capable of emitting a different color light. Each cell could then be interrogated separately to produce the proper blend of each color in each fluorescent spot. Alternatively, a color display could be devised by multiplexing several frequencies on the same pulse train in combination with a suitable two-photon fluorescent medium.

Figure 3:
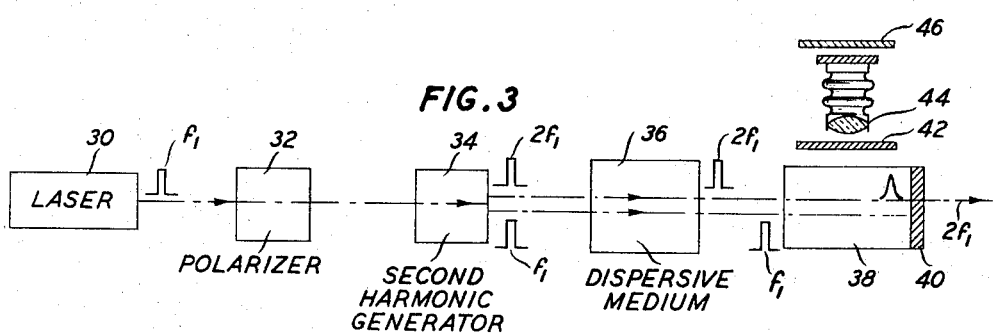
FIG. 3 shows schematically a picosecond pulse detector in accordance with one embodiment of the invention.

In addition to a display system, the present invention contemplates the use of a two-photon fluorescent medium as a picosecond pulse detector as shown in FIG. 3. A picosecond pulse at optical frequency $f_1$ (generated by phase-locked laser 30, for example) is polarized by polarizer 32 and then passed through a second harmonic generator 34, typically a KDP crystal. The output of the generator 34 consists of a pulse at frequency $f_1$ and one at the second harmonic $2f_1$, the intensity of the second harmonic being typically one hundred times less than that of fundamental. These pulses actually travel along colinear paths, but for the purposes of clarity the paths have been separated in FIG. 3 into two parallel paths. The two pulses are first directed into a dispersive medium 36, typically bromobenzene, which delays the second harmonic with respect to the fundamental, and are then directed into one end of two-photon fluorescent medium 38. At the other end is disposed a mirror 40 which is transparent to the second harmonic but not to the fundamental. The fundamental strikes the mirror first, is reflected, and subsequently overlaps the second harmonic producing a fluorescent spot within the region of overlap. The shape of the spot, whose intensity and length are proportional respectively to the pulse intensity and width, is a convolution of the shapes of the overlapping pulses and may be photographed by a camera system comprising a filter 42 which absorbs the light at frequencies $f_1$ and $2f_1$ but transmits the fluorescent light, a lens 44 and a photographic plate 46. The advantage of elimination of the background trace here is the ability to display weak picosecond signals which could otherwise be obscured in the background fluorescence.

In a specific example, the medium 38 comprises a $5 \times 10^{-2}$ M solution of diphenylcyclopentadiene (DPCPD) in tetrahydrofuran which exhibits a fluorescent maximum at $0.43\mu$. The laser 30 is typically a phase-locked Nd:glass laser which generates a train of picosecond plane-polarized pulses spaced 3.3 nsec. apart at an optical wavelength $\lambda_1 = c/f_1 = 1.06\mu$. The second harmonic generator 34, a KDP crystal set at the phase-matching angle, produces at its output a train of pulses at an optical wavelength $\lambda_2 = c/f_2 = 0.53\mu$ in addition to the train of pulses at $1.06\mu$. The intensity of the $1.06\mu$ pulse train is about 1 G watt/cm.$^2$ and that of the $0.53\mu$ pulse train about 1 M watt/cm.$^2$. The composite beam is then passed through a dispersive medium 36 of bromobenzene having a length chosen so that dispersion causes the $1.06\mu$ pulses to emerge from the dispersive medium 30 psec. ahead of the $0.53\mu$ pulses. The beam finally enters a 2 cm. long cell containing a DPCPD solution and strikes at normal incidence the dielectric mirror 40 which typically has about 75% reflectivity at $1.06\mu$ and less than 5% reflectivity at $0.53\mu$. The fluorescent patterns produced in the DPCPD cell 38 may be recorded at 3000-speed Polaroid film 46 by means of an $f/4$ camera 44 viewing the cell through a dark blue Corning 7-59 filter 42. The filter allows the DPCPD fluorescence ($0.46\mu$ to $0.40\mu$) to be recorded, but absorbs the $0.53\mu$ and $1.06\mu$ scattered light.

What is claimed is:
1. Optical apparatus comprising
   a display device comprising a medium having an energy gap defined by a higher and a lower energy state, the separation of the energy states being such as to require the absorption of two photons to excite electrons from the lower to the higher energy state, and being characterized by a transition from the higher to the lower state which produces fluorescence,
   means for generating a first signal having a frequency such that simultaneous absorption by the medium of two photons from the signal is sufficient to excite electrons from the lower to the higher energy state, and being of an intensity insufficient to produce detectable fluorescence,
   means for generating a second signal having a frequency such that the simultaneous absorption of two photons from the signal is insufficient to excite electrons from the lower to the higher energy state, and being of high enough frequency and intensity to produce detectable fluorescence when the first and second signals simultaneously overlap within a region of said medium, and
   means for producing within said medium an optical representation of the image information carried by one of said signals by causing said signals to overlap within a region of said medium and to absorb simultaneously a single photon from each of the signals per quantum of fluorescent radiation, thereby to produce a fluorescent spot in the region of overlap.

2. The optical apparatus of claim 1 wherein said second signal generating means comprises a source of pulses of optical energy, and said first signal generating means comprises a second harmonic generator, the second signal being directed into said second harmonic generator.

3. The optical apparatus of claim 1 wherein said means for causing the signals to overlap comprises means for delaying one of the signals with respect to the other comprising a dispersive medium, means for directing the delayed signal and the other signal into one end of said medium along colinear paths, a reflector disposed at the other end of said medium normal to the path of the signals, said mirror being highly transparent to the delayed signal and highly reflective to the other signal.

4. The optical apparatus of claim 1 wherein said medium comprises pyrene.

5. The optical apparatus of claim 1 wherein said medium comprises tetraphenylcyclopentadiene.

6. The optical apparatus of claim 1 wherein said medium comprises diphenylcyclopentadiene.

7. The optical apparatus of claim 6 wherein the first signal has a wavelength of about $0.53\mu$ and the second signal has a wavelength of about $1.06\mu$.

8. The optical apparatus of claim 6 wherein the first signal has an intensity of about one megawatt per square centimeter and the second signal has an intensity of about one gigawatt per square centimeter.

9. The optical apparatus of claim 1 in combination with
means for modulating said one of said signals to carry image information,
means for modulating the other signal to produce interrogate pulses, and
wherein said means for producing within said medium an optical representation of one of the signals comprises means for producing an optical representation of the image information carried by said one signal.

10. The optical apparatus of claim 9 wherein said signals are directed along colinear paths from opposite directions and said medium is divided in $n$ imaginary cells of width $d$ along the colinear path, and wherein the image information signal comprises a pulse train having a pulse spacing in space of $2d$ and the other signal comprises a pulse train having a pulse spacing in space of $nd$.

11. The optical apparatus of claim 9 wherein said second signal generating means comprises a phase-locked laser, and said first signal generating means comprises a frequency changer, and means for directing the first signal into said frequency changer.

12. The optical apparatus of claim 11 wherein said frequency changer comprises a second harmonic generator.

References Cited

UNITED STATES PATENTS

| 3,123,711 | 3/1964 | Fajans | 250—71 |
| 3,253,497 | 5/1966 | Dreyer | 250—71 |
| 3,296,594 | 1/1967 | Van Heerden | 331—94.5 |

THOMAS B. HABECKER, Primary Examiner

M. M. CURTIS, Assistant Examiner

U.S. Cl. X.R.

250—71; 331—94.5